(12) United States Patent
Hoopes

(10) Patent No.: US 11,513,750 B2
(45) Date of Patent: Nov. 29, 2022

(54) PRINT JOB MANAGEMENT ACROSS SUBSCRIPTION SERVICES

(71) Applicant: HEWLETT-PACKARD DEVELOPMENT COMPANY, L.P., Spring, TX (US)

(72) Inventor: Benjamin Hoopes, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/499,299

(22) PCT Filed: Apr. 30, 2018

(86) PCT No.: PCT/US2018/030132
§ 371 (c)(1),
(2) Date: Sep. 29, 2019

(87) PCT Pub. No.: WO2019/212468
PCT Pub. Date: Nov. 7, 2019

(65) Prior Publication Data
US 2021/0326083 A1    Oct. 21, 2021

(51) Int. Cl.
*G06F 3/12* (2006.01)
*G06Q 20/12* (2012.01)
*G06Q 20/32* (2012.01)

(52) U.S. Cl.
CPC ............ *G06F 3/126* (2013.01); *G06F 3/1204* (2013.01); *G06F 3/1285* (2013.01); *G06Q 20/127* (2013.01); *G06Q 20/3224* (2013.01)

(58) Field of Classification Search
CPC combination set(s) only.
See application file for complete search history.

(56) References Cited

U.S. PATENT DOCUMENTS

| 6,748,471 B1 | 6/2004 | Keeney et al. |
| 6,982,804 B2 | 1/2006 | Frolik et al. |
| 7,856,400 B2* | 12/2010 | Knodt ............ G06Q 20/102 705/40 |
| 8,503,634 B1* | 8/2013 | Townsend, III ....... G06Q 40/02 379/114.04 |
| 10,379,801 B1* | 8/2019 | Waller ............... G06F 3/1285 |

(Continued)

FOREIGN PATENT DOCUMENTS

WO    WO2013154580 A1    10/2013

*Primary Examiner* — Helen Zong
(74) *Attorney, Agent, or Firm* — HP Inc. Patent Department

(57) ABSTRACT

An example of an apparatus includes a network interface to receive print data from a device, the print data associated with a first subscription service. The apparatus also includes a memory storage unit to store the print data including a database of subscription services, wherein the database of subscription services includes the first subscription service and a second subscription service. In addition, the apparatus includes a subscription manager to manage the database of subscription services. The subscription manager deducts print credit from a first subscription service account based on the print data. The apparatus includes a selection engine to select a printing device for the print data, wherein the printing device is associated with the second subscription service.

18 Claims, 4 Drawing Sheets

(56) References Cited

U.S. PATENT DOCUMENTS

| | | | | |
|---|---|---|---|---|
| 2002/0002688 A1* | 1/2002 | Gregg | ............... | H04L 63/08 |
| | | | | 726/3 |
| 2004/0196486 A1* | 10/2004 | Uchino | ............ | G06F 3/1272 |
| | | | | 358/1.14 |
| 2010/0075630 A1* | 3/2010 | Tillitt | ............ | G06Q 20/28 |
| | | | | 455/406 |
| 2011/0220711 A1 | 9/2011 | Hendley et al. | | |
| 2012/0179607 A1* | 7/2012 | Abifaker | ............ | G06Q 20/20 |
| | | | | 705/41 |
| 2013/0165075 A1 | 6/2013 | Rishy-Maharaj et al. | | |
| 2014/0132982 A1 | 5/2014 | Neville et al. | | |
| 2016/0005113 A1* | 1/2016 | Mendez | ............ | G06Q 40/02 |
| | | | | 705/35 |
| 2016/0012465 A1* | 1/2016 | Sharp | ............... | G06Q 20/386 |
| | | | | 705/14.17 |
| 2017/0070642 A1* | 3/2017 | Miyamoto | ......... | H04N 1/344 |
| 2018/0349881 A1* | 12/2018 | Steele | ............ | G06Q 20/4037 |
| 2019/0332340 A1* | 10/2019 | Somaiah | ............ | G06F 3/1292 |

* cited by examiner

PRINT JOB MANAGEMENT ACROSS SUBSCRIPTION SERVICES

BACKGROUND

Printed documents are often used to present information. In particular, printed documents continue to be used despite the availability of electronic alternatives as they are more easily handled and read by users. Accordingly, the production of printed documents remains an important tool for the presentation and handling of information. Printers are known and have been used to produce documents based on information received via a network.

BRIEF DESCRIPTION OF THE DRAWINGS

Reference will now be made, by way of example only, to the accompanying drawings in which.

DETAILED DESCRIPTION

Figure 1:
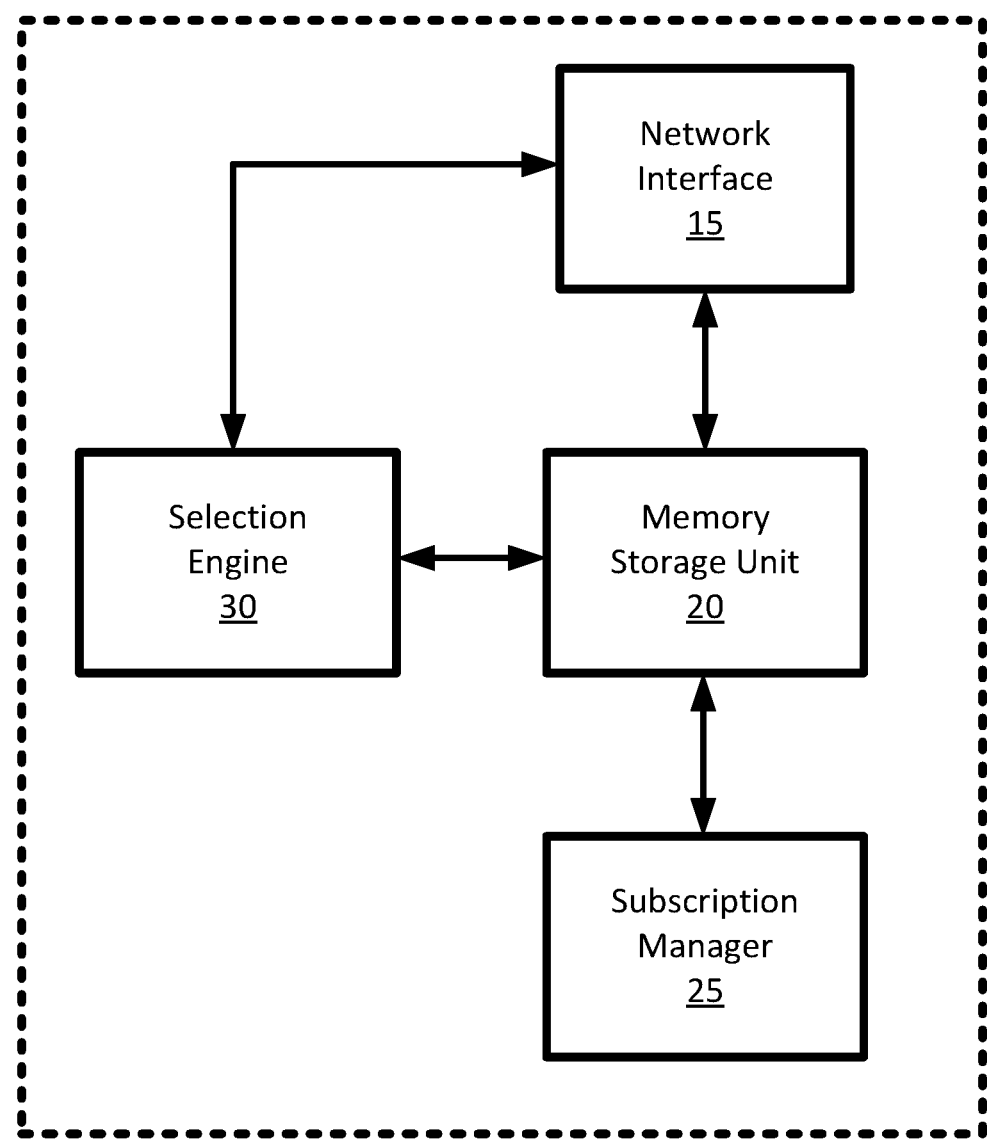
FIG. 1 is a block diagram of an example apparatus to manage print jobs.
Figure 1:

Printed documents may be widely accepted and may often be more convenient to use. In particular, printed documents are easy to distribute, store, and be used as a medium to disseminate information. In addition, printed documents may serve as contingency for electronically stored documents, such as may happen when an electronic device fails, such as with a poor data connection for downloading the document and/or a depleted power source. When printing documents, documents are often produced at a printing device based on data received from a computing device. For example, the printing device may form markings, such as using liquid print fluids, on print media based on the received print data. Some users of printing devices may print documents within a contractual platform. In some cases, for example, a contractual platform may include printing devices that are provided as a device as a service, such as part of a device lease. In such applications, the printing devices are provided to the user by a service provider where the service provide is responsible for maintaining the printing device, such as replacing parts periodically and/or refilling print substances, such as ink, and tracking impressions. Such a contractual platform may be of interest because, for example, users of the printing device may not wish to worry about such issues. In another example, a contractual platform may include printing devices that are purchased and device service, consumable part replacement and/or print substance refilling, and impression tracking are managed by a service provider.

Contractual platforms may track the use of the printing device and maintain a record to appropriately bill the user for the services. In one example, for instance, the client may pay a monthly fee under which a number of impressions are included. For example, the contractual platform may count the number of pages produced (where pages may comprise multiple impressions, such as for duplex printing) by a printing device or use a more complex accounting method to take the amount and type of print substances used into consideration in charging for services rendered under the contractual platform. In addition, different printing devices may be subjected to different contractual platforms which may create barriers to true mobile printing. For example, an employee may wish to print a lengthy document for a company from home. In this example, the company may have an enterprise contractual platform under which a large number of documents may be printed, such as at the company's office based printing devices. However, while at home, the employee may not be able to readily access company printing devices. And while the employee may have a personal printing device, that device may print under a consumer contractual platform, which may include print credits to produce a relatively small number of pages. There may be an interest in printing documents across platform, contractual, and subscription barriers.

Referring to FIG. 1, an apparatus to manage print jobs received via a network across subscription services is shown at 10. The apparatus 10 may include additional components, such as various additional interfaces and/or input/output devices such as displays to interact with a user or an administrator of the apparatus 10. The apparatus 10 is to receive print data from the network, such as from a computing device. In the present example, the apparatus 10 includes a network interface 15, a memory storage unit 20, a subscription manager 25, and a selection engine 30. Although the subscription manager 25 and the selection engine 30 are shown as separate components, these components may be operated by a single processor, a plurality of processors, or even on separate servers as discussed in more detail below. Furthermore, although the memory storage unit 20 is shown as a single component, memory storage unit 20 may comprise multiple memory storage units within and/or be external to apparatus 10, such as part of a distributed network of memory devices.

The network interface 15 is to communicate with a network such as a wired or wireless network which may include a cellular network. In the present example, the network interface 15 is to receive print data from the computing device, where the print data may represent a print job via the network. The print data is not particularly limited and includes data associated with the production of a document at a printing device. For example, the print data may include a generated print job received from the computing device. In other examples, the print data may represent raw data from an application, such as a word processor, where the print data may be further processed at the apparatus 10. In another example, the print data may be a subset of data associated with a print job to include the relevant information for the subscription manager 25 to manage the subscription service data of an account.

In the present example, the print data is associated with a subscription service of a company, such that the print data may be a print job generated from a document created in a work environment in relation to a project of a company for which a user works. As another example, the print data may represent the document in a format such as the word processing format used to create the document. Accordingly, since the document is related to a work product, it follows that the print data is to be associated with an account of a subscription service of the company for printing instead of being associated with an account of a personal subscription service of the user. It is to be appreciated that the user may create the print data from any computing device, such as a portable electronic device or a personal computer to represent documents to be produced at a printing device and that it is the content of the print job that determines the association with the company subscription service.

The manner by which the association is determined is not limited and may involve prompting the user for input. For example, the device may generate and send a prompt to the user to select the subscription service to which the print job is to be charged. In other examples, subscription manager 25 may analyze the content of the print data to determine an appropriate subscription service to which the print job is to be charged. For example, the subscription manager 25 may read metadata associated with the print data or determine the type of document with various recognition methods, such as determining a user account or email from which the print data originated or using machine learning.

The memory storage unit 20 is coupled to the network interface 15 and may include a non-transitory machine-readable storage medium that may be any electronic, magnetic, optical, or other physical storage device. In the present example, the memory storage unit 20 may be a collection of physical storage devices within a networked environment. For example, the storage devices may be on different servers and in communication with each other to act as the memory storage unit 20, such as in a cloud-based storage system. In other examples, the memory storage unit 20 may be a single device within a server to store the print data received via the network interface 15 as well as a database of subscription services at a single location, such as on the same server.

The database of subscription services includes information, such as balance information, of both the subscription service of the company and the subscription service of the user. In other examples, the database of subscription services may be distributed across multiple servers such that a subset of data related to the subscription services (e.g., data related to one party) is stored in the memory storage unit 20.

The non-transitory machine-readable storage medium may include, for example, random access memory (RAM), electrically-erasable programmable read-only memory (EEPROM), flash memory, a storage drive, an optical disc, and the like. The memory storage unit 20 may also be encoded with executable instructions to operate the network interface 15 and other hardware in communication with the processor.

In the present example, the memory storage unit 20 may also store an operating system that is executable by the processor to provide general functionality to the apparatus 10, for example, functionality to support various applications such as a user interface to access various features of the apparatus 10. Examples of operating systems include Windows™, macOS™, iOS™, Android™, Linux™, and Unix™. The memory storage unit 20 may additionally store applications that are executable by a processor to provide specific functionality to the apparatus 10, such as those described in greater detail below.

The memory storage unit 20 may also store additional executable instructions for the operation of the apparatus 10. In the present example, the executable instructions may include a set of instructions to run in order to operate the subscription manager 25 and the selection engine 30.

The subscription manager 25 may be operated by a processor of the apparatus 10. In the present example, the subscription manager 25 is to manage the database of subscription services stored on the memory storage unit 20 and/or manage the database of subscription services stored externally to the apparatus 10, but accessible by the network interface 15, such as using an application programming interface (API). The manner by which the subscription manager 25 manages the subscription services is not particularly limited. In the present example, the subscription manager 25 is to associate print data with specific subscription services. The print data may be associated with a subscription service based on the content or source of the print data, such as whether it is determined to be a company related document or received from a company account. Alternatively, the print data may be associated with a subscription service based on the printing device to which the print data is intended to be sent. For example, if the print data is intended to be sent to a home printing device based on a consumer subscription service, the subscription manager 25 may associate the print data with the consumer subscription service despite the content or source of the print data being associated with an enterprise subscription service of a company.

In other examples, the subscription manager 25 may associate the print data with two or more subscription services. Continuing with the example presented above of a user printing lengthy company related documents at home, the subscription manager 25 may associate the print data with both an enterprise subscription service of the company and the consumer subscription service associate with the printing device at the home of the user. In this example, the subscription manager 25 may enable deducting print credits from accounts of both subscription services and refunding an offset credit to the account of the consumer subscription service. Accordingly, in this example, the consumer subscription service may operate normally during printing and receive offset credits to an account of the consumer subscription service in the same manner that the consumer subscription service account is replenished, such as in a pay-as-you-go scenario. Therefore, the subscription manager 25 may communicate with the consumer subscription service, such as through an application programming interface, without having to add further programming and/or features to the consumer subscription service.

This method may be used in situations where the subscription services use different units for calculating costs and/or print credits. For example, the enterprise subscription service may be associated with multiple printing devices capable of producing documents via several different means and of different types of print media. Accordingly, this subscription service may measure print credits by using a monetary amount such that each page printed may deduct a varying amount from the print credit of the account which may be dependent on the medium on which the document is produced, the type of ink used to produce the document, the type of printing device used, or the location of the printing device. However, the consumer subscription service may be associated with a single printing device having a single medium and measure print credits by simply counting the number of pages regardless of the content printed. Accordingly, an offset credit may be calculated between the two subscription services.

The manner by which the offset credit is calculated and applied is not limited and may be a ratio of the number of pages actually printed or it may be equal to the number of pages actually printed. It is to be appreciated that the offset credit may or may not be equal to the print credit deducted from the account of the consumer subscription service due to differences in prices and costs of maintaining equipment associated with each subscription service.

The selection engine 30 may also be operated by a processor of the apparatus 10. In the present example, the selection engine 30 is to select a printing device to which the print data is to be sent. In the present example, the printing device that is to be selected is not particularly limited. If the printing device is associated with the same subscription service as the print data, the print data will be sent to the printing device and processed in a usual manner. If the printing device is associate with a different subscription service from that associated with the print data, such as in the example described above relating to an employee attempting to print a lengthy document from a home printing device, the selection engine 30 may still select the home printing device without depleting the user's consumer subscription service.

The manner by which the selection engine 30 selects the printing device is not particularly limited. For example, the selection engine 30 may send a request to a computing device for an indication of the printing device to which the print data is to be sent. For example, the request may direct the computing device to generate a prompt to confirm the printing device to which the print data is to be sent. In some examples, the prompt may include a list of printing devices based on the proximity of the printing device to the computing device. The proximity of the printing device to the computing device may be determined using a geolocation device, near field communication between the computing device and the printing device, Bluetooth beacons, an address associated with the account, or by the identity of the network(s) connecting the computing device to the printing device, such as an IP address.

In other examples, the selection engine 30 may automatically select the printing device. For example, the selection engine 30 may be directed to select the physically closest printing device to the computing device. In other examples, the selection engine 30 may select an available printing device from a known list of acceptable printing devices in a predetermined order by which the printing device are to be accepted.

In the present example, the print job received by the printing device may be generated by the computing device. For example, the computing device may have a universal print driver to generate the print job to be sent to the printing device indicated by the selection engine 30. In this example, the apparatus 10 may be used to oversee the transmission of the print job from the computing device to the printing device. Therefore, the apparatus may not receive the print job in its entirety but may receive print data with information about the print job relevant to the determination of print credits and/or offset credits.

In other examples, the apparatus 10 may include a print engine. For example, the print engine may be to generate a print job based on the print data (e.g. a document in a word processing format) received via the network interface 15. In this example, the print engine may also route the print job to the printing device based on a selection of a printing device from the selection engine 30. Furthermore, the print engine may send information regarding the print job to the subscription manager 25 such that the subscription manager 25 may deduct a print credit based on the print data from an account of the subscription service.

Figure 2:
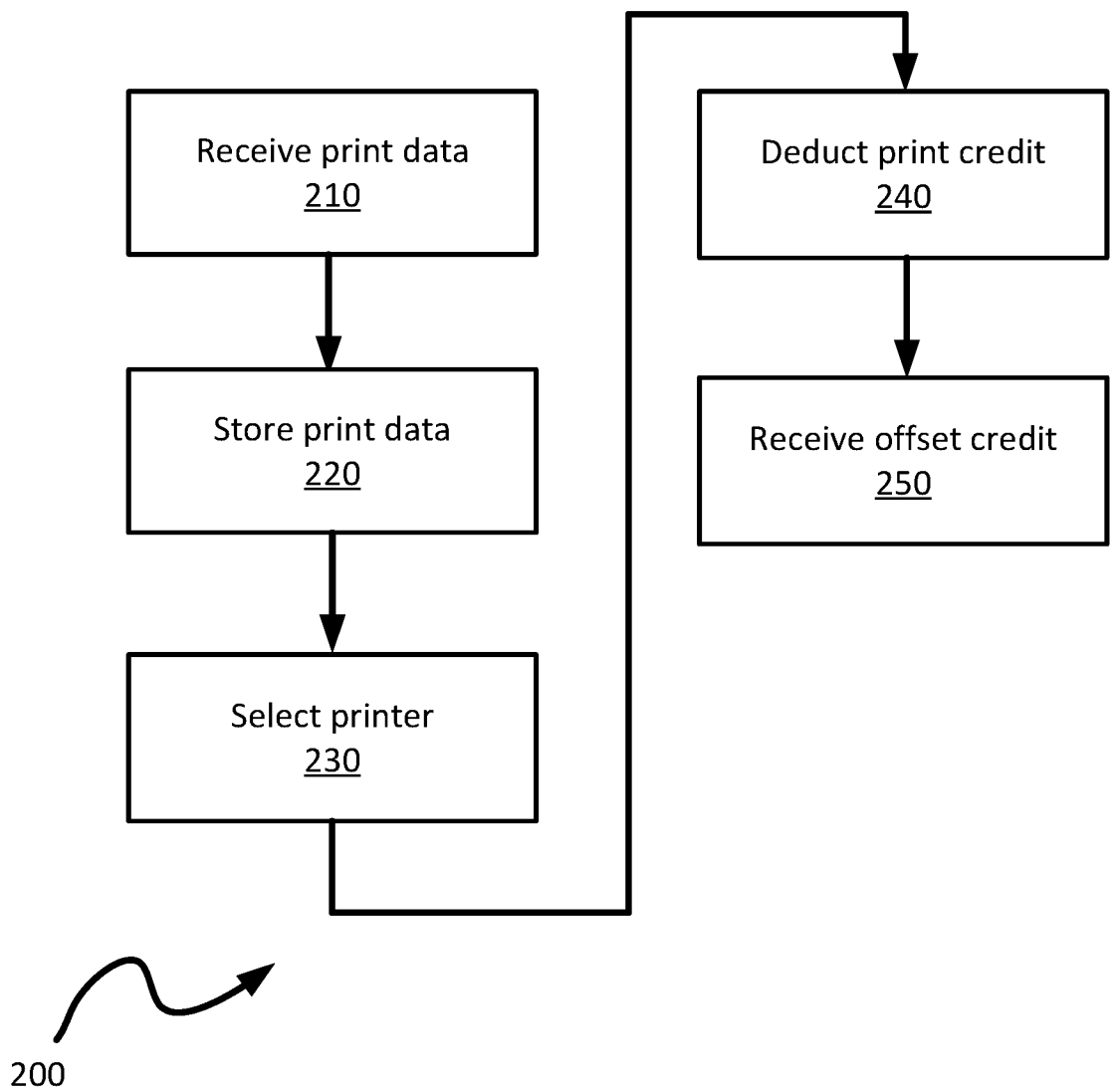
FIG. 2 is a flowchart of an example method of managing print jobs.

Referring to FIG. 2, a flowchart of a method to handle print data across a network is shown at 200. In order to assist in the explanation of method 200, it will be assumed that method 200 may be performed with the apparatus 10. Indeed, the method 200 may be one way in which apparatus 10 may be configured to interact with a computing device and a printing device. Furthermore, the following discussion of method 200 may lead to a further understanding of the apparatus 10 and its various components. Furthermore, it is to be emphasized, that method 200 may not be performed in the exact sequence as shown, and various blocks may be performed in parallel rather than in sequence, or in a different sequence altogether.

Beginning at block 210, the apparatus 10 receives print data from a computing device from a network via the network interface 15. In the present example, the apparatus 10 is a consumer print server to manage print data for consumer subscription services, such as personal printing devices in homes. Furthermore, in this example, the computing device is a portable electronic device such as a laptop, tablet, or smartphone on which a user may generate the print data from multiple locations. For example, the user may work on a portion of a document at an office location during business hours and continue working on the document from home in the evening. The manner by which the print data is received from the computing device is not particularly limited. In the present example, the network interface 15 may receive print data from a network containing the print job. In other examples, the print job may not be generated at the apparatus 10 and may be generated at the computing device and sent via another print server or directly to the printing devices. In such examples, the print data may include information about the print job relevant to determining print credits and offsets by the apparatus.

In the present example, the print data further represents content associated with an enterprise print server. The association with the enterprise print server is not particularly limited and the determination thereof may be varied from one application to another. In particular, different companies may have differing policies on the requirement for a document or print data to be associated with the enterprise print server such that the costs of printing may be deducted from the account of the enterprise subscription service of the company. For example, print data may be defined to be associated with the enterprise print server of the company if it is generated on a company issued device, such as a company laptop. As another example, the print data may be defined to be associated with the enterprise print server of the company if it is generated for company business. It is to be appreciated that determining whether print data is generated for company business may require a declaration or other indication from the user or a supervisor of the user. Alternatively, an automated analysis of the content of the print data may be performed to evaluate the content based on various predefined rules to determine if the print data was generated for company business.

Although the present example of the method 200 uses separate a consumer print server and enterprise print server, other implementations of the method 200 may be modified to use a single print server. In such examples, the single print server will be capable of managing both the consumer subscription service of the user and the enterprise subscription service of the company.

Block 220 involves the print data received at block 210 to be stored in the memory storage unit 20 of the consumer print server. The manner by which the print data is stored is not particularly limited. For example, the print data may be stored in a database or queue of the memory storage unit 20. It is to be appreciated that print data from multiple computing devices may be received. In particular, the print data may be from different user accounts and associated with different subscription services. For example, if the apparatus 10 is a consumer print server, the apparatus 10 may be used to collect print data for multiple different users, each having a personal printing device and manage monitoring the print data and the associated print jobs processed by the various printing devices for producing documents. Accordingly, the memory storage unit 20 of the present example may also maintain a database to store consumer subscription data, such as details about the user, the features of the subscription service to which the user subscribes, and the location of the printing device of the user. In some examples, the memory storage unit 20 may also include multiple databases and queues to organize the print data that are received via the network.

Next, block 230 involves the selection of a printing device for the print data. In the present example, the printing device selected is proximate to the portable electronic device from which the print data was received at block 210. The manner by which the selection is made is not particularly limited and the printing device selected may also not necessarily be the closest printing device to the portable electronic device. Instead, the printing device selected is proximate which may mean that the printing device is within a predetermined distance, such as within the same building, within a wireless network range, or within a predefined geolocation defined by GPS coordinates. Accordingly, other factors may be used to select the printing device, such as user preferences. In other examples, the connection between the portable electronic device and the printing device may be a factor in the selection, such as selecting a printing device that is connected to the same network as the portable electronic device, for example, a home wireless network. Alternatively, the selection may be made based on user input such as from a prompt generated at the portable electronic device.

In this example, the printing device is to be selected from a database of printing devices stored on the memory storage unit 20 of the consumer print server. In the present example, the selection is carried out based on location data received from a portable electronic device, such as GPS data, network ID information, etc. In other examples, the printing device may be selected from a predetermined list of user or administrator preferences.

In most situations, it is to be understood that the portable electronic device from which the print data is received may be a laptop on which a user performs the majority of work to create the print data. For example, the user may prepare a document in a word processing program while in the office and connected to the enterprise print server proximate to company printing devices. The user may then take the laptop home to complete the preparation document, send the document for printing at the nearest printing device, which may be the printing device at the user's home. In the present example, the portable electronic device transmits location data (e.g., global positioning coordinates, IP address, etc.) along with the print data such that the selection engine can determine a printing device to which a print job is to be sent. In other examples, additional locating devices, such as beacons, may be used to detect the portable electronic device.

In some examples, such as when the portable electronic device is not close to any printing device, a printing device may be selected such that the print job associated with the print data received at block 210 is sent to a predetermined printing device prior to the arrival of the user at the printing device. In particular, this feature may be useful in a situation in which the user is en route to a location such as home and intends to send a print job to a personal printing device at home to review upon arrival. In other examples in which print job security is a concern, the consumer print server may require that the portable electronic device be within a threshold range of the printing device. The range may be increased or decreased to achieve a desired level of security. In some examples, the threshold distance may be dependent on other facts, such as document size, printing device characteristics like printing speed, and/or the speed at which the portable electronic device is approaching the printing device. In examples with a variable threshold distances, the apparatus may be tuned such that the user arrives at the printing device as the document printing is completed.

Block 240 deducts a consumer print credit from the consumer subscription data based on the print job sent to the printing device of the user. In this example, the print credit may be deducted using the subscription manager 25 and may correspond to the number of pages produced by the printing device. In other examples, the print credit may be deducted from an account on the enterprise print server associated with the print job such that the consumer print server only manages the processing and transmission of the print job to the personal printing device.

At block 250, the enterprise print server calculates an offset credit and communicates the credit to add to the consumer subscription data. In the present example, the offset credit is calculated at the enterprise print server. In other examples, the offset credit may be calculated at the consumer print server or via another separate server of third party service. In another example, the consumer print server may include an application programming interface to allow access to the subscription services by third party services, such that relevant information about the subscription services or subscription service accounts may be queried. The manner by which the offset credit is calculated and applied is not limited and may be a ratio of the number of pages actually printed or it may be equal to the number of pages printed. It is to be appreciated that the offset credit may or may not be equal to the print credit deducted from the account of the consumer subscription service due to differences in prices and costs of maintaining equipment associated with each subscription service.

Continuing the example above of an employee of a company printing on a personal printing device, it may be assumed that the personal printing device with an associated account includes a relatively small number of print credits measured in pages, such as 50 pages. If the employee works from home and intends to print a 50-page document on the personal printing device for review as part of the employee's job, the employee will deplete all of the print credits from the consumer subscription service account. By using the apparatus 10 to carry out the method 200, the print job generated from the printing of the 50-page document will be recognized as being associated with an enterprise subscription service such that the print credits will be deducted from an account associated with the enterprise subscription service. An offset credit will also be calculated and applied to the account of the consumer subscription service such that the print job on the personal printer does not effectively deduct print credits from the account of the consumer subscription service.

Figure 3:
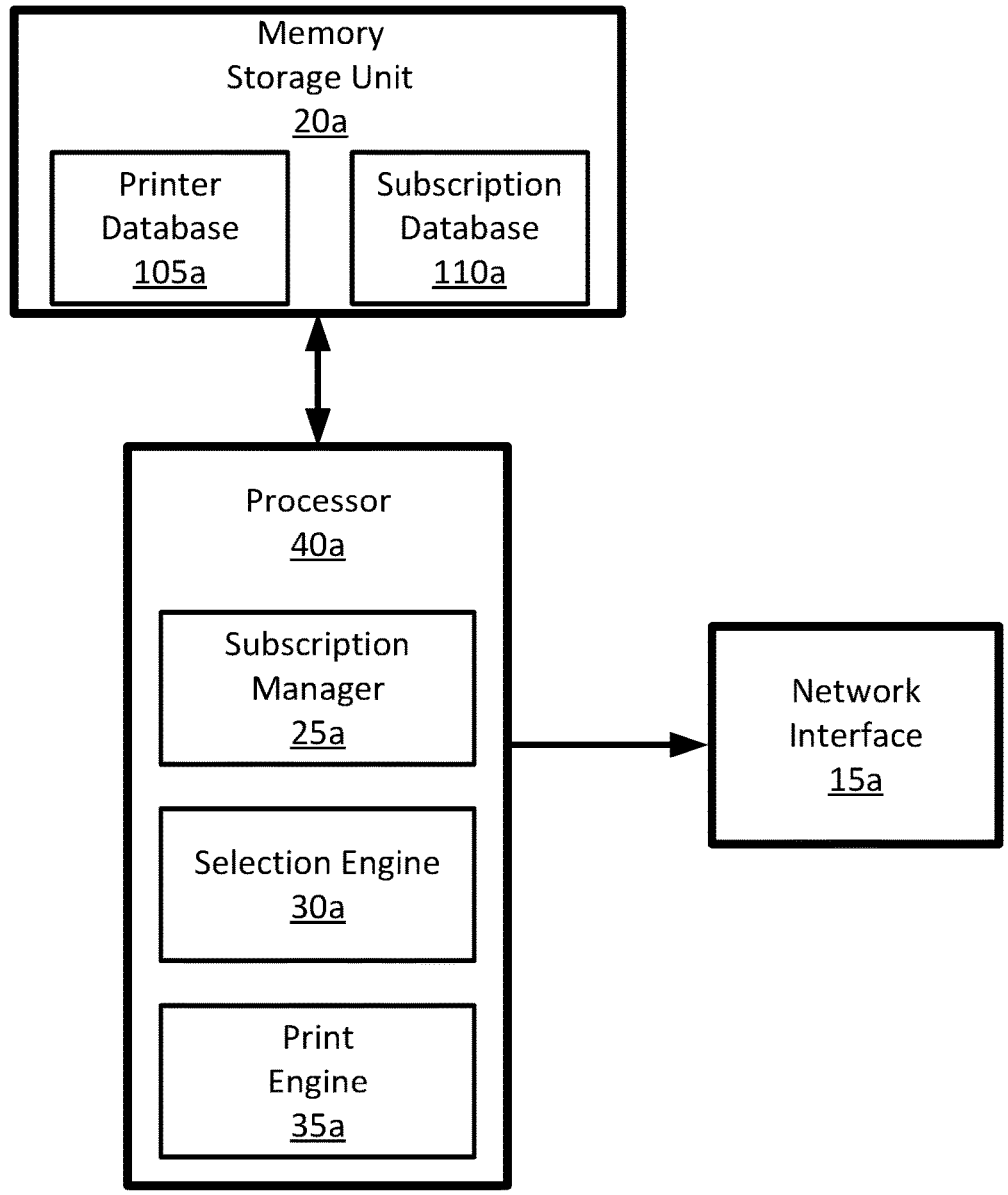
FIG. 3 is a block diagram of another example apparatus to manage print jobs.

Referring to FIG. 3, another example of an apparatus to manage print data received via a network across subscription services is shown at 10a. Like components of the apparatus 10a bear like reference to their counterparts in the apparatus 10, except followed by the suffix "a". The apparatus 10a includes a network interface 15a, a memory storage unit 20a, and a processor 40a. The processor 40a may be to operate a subscription manager 25a, a selection engine 30a, and a print engine 35a as well as carry out a set of instructions to operate the apparatus 10a in general. In addition, the apparatus 10a may be connected to device generating print data. Accordingly, the apparatus 10a is another example that may be used to carry out the method 200.

The network interface 15a is to communicate with a network, such as a wireless network, to receive print data associated with a subscription service from a device. In the present example, the device is not particularly limited and may be a laptop, smartphone, smartwatch, computer, tablet, or other electronic device capable of generating print jobs. Furthermore, the print data in this example is associated with a subscription service of a company. For example, the print data may represent a work document for printing.

The memory storage unit 20*a* is coupled to the processor 40*a* and may include a non-transitory machine-readable storage medium that may be any electronic, magnetic, optical, or other physical storage device. In the present example, the memory storage unit 20*a* stores the print data received at the network interface 15*a* from the computing device.

The non-transitory machine-readable storage medium may include, for example, random access memory (RAM), electrically-erasable programmable read-only memory (EE-PROM), flash memory, a storage drive, an optical disc, and the like. The memory storage unit 20*a* may also be encoded with executable instructions to operate the network interface 15*a* and other hardware, such as various input and output devices like a monitor, keyboard or pointing device to allow a user or administrator to operate the apparatus 10*a*.

The memory storage unit 20*a* may also store an operating system that is executable by the processor 40*a* to provide general functionality to the apparatus 10*a*, for example, functionality to support various applications such as a user interface to access various features of the apparatus 10*a*. Examples of operating systems include Windows™, macOS™, iOS™, Android™, Linux™, and Unix™. The memory storage unit 20*a* may additionally store applications that are executable by the processor 40*a* to provide specific functionality to the apparatus 10*a*.

In the present example, the memory storage unit 20*a* includes a printer database 105. In the present example, the printer database 105 is to store information relating to a plurality of printing devices. For example, the printer database 105 may include a list of the printing devices along with an identifier for each printing device, such as a media access control address, as well as characteristics of each printing device, such as duplex capabilities, color printing capabilities, geolocation of the printing device, and other finishing options. In addition, the printer database 105 may include information on the location of the printing device. For example, the printer database 105 may be maintained on a consumer print server and include all relevant information about printing devices maintained by a consumer subscription service for multiple users.

The memory storage unit 20*a* may further include a subscription database 110*a* to store information relating to a subscription service associate with user. For example, the subscription database 110*a* may include details of the subscription to which a specific user has purchased. For example, the data associated with each subscription service may include a number of pages the user is allocated per period of time, the type of printing device and/or print media associated with the subscription service as well as billing information associated with the subscription.

Although the present example illustrates two databases 105 and 110, it is to be appreciated that the memory storage unit 20*a* is not particularly limited and that additional databases may be maintained to store additional data. For example, the memory storage unit 20*a* may include one or more print queues, a and a database to store security protocols associate with each user and/or printing device.

The processor 40*a* may include a central processing unit (CPU), a microcontroller, a microprocessor, a processing core, a field-programmable gate array (FPGA), or similar. The processor 40*a* and memory storage unit 20*a* may cooperate to execute various instructions. The processor 40*a* maintains and operates the subscription manager 25*a* to manage the database of subscription services stored on the memory storage unit 20*a*. The subscription manager 25*a* may operate in a similar manner to the subscription manager 25 described above. In particular, the subscription manager 25*a* may be to modify subscription data in either the enterprise print server or the consumer print server and to determine an offset credit to apply to an account of a consumer subscription service in view of producing work-related documents associated with an enterprise subscription service.

The selection engine 30*a* may also be operated by a processor 40*a* of the apparatus 10*a*. In the present example, the selection engine 30*a* is to select a printing device to which the print data is to be sent. In the present example, the printing device that is to be selected is not particularly limited. If the printing device is associated with the same subscription service as the print data, the print data will be sent to the printing device and processed in a usual manner. If the printing device is associated with a different subscription service from that associated with the print data, the selection engine 30*a* may select the home printing device without depleting the print credit from the subscription service of the user.

In some examples, the device of the user may include a sensor to detect a beacon. Accordingly, the beacon may be used to identify the printing device in a geolocation to which print data may be sent. For example, the beacon of a personal printing device may indicate that it is ready to receive print data from the device of a user, such as a laptop or smartphone as the user arrives in the geolocation.

Therefore, the processor 40*a* may be used to select the printing device from the database 105 of printing devices based on the location of the computing device. In particular, the processor 40*a* may select a printer or printing device within a predefined area which includes a GPS coordinate measured at the device. The manner by which the processor 40*a* selects the printing device is not limited and may include analyzing context data, such as location data, to determine the nearest printing device to the location of the portable electronic device. In some examples, the processor 40*a* may also delay the selection of the printing device until the device and user are within a threshold distance of a printing device. In cases where the device is within the threshold distance of more than one printing device, the processor 40*a* may generate a notification to the device to present a list of the aggregated printing devices on a user interface such that the user may provide input via the portable electronic device. In other examples, the processor 40*a* may further evaluate the context data to make a selection from the list. For example, the context data may include a preferred printing device. In another example, the context data may include behavior patterns of the user or determine a direction the user is moving to select a printing device that is on route or at the expected final destination of the user. For example, if the user is known to travel home at a certain time, the processor 40*a* may send the print data to the user's personal printing device at home. As another example, the selection may be made based on a determination if where the printing device, the computing device and the portable electronic device are connected to the same local area network over a secure connection. The GPS coordinate in the context data may also be used to identify secure locations or to confirm that the networks to which the portable electronic device is correct.

Accordingly, the processor 40a may execute instructions stored on the memory storage unit 20a to implement the print engine 35a and to generate print jobs based on the print data received from the device. It is to be appreciated that in other examples, the print engine 35a may be substituted with an external engine, such as another server or machine, or carried out by a virtual machine in the cloud.

In the present example, the processor 40a maintains and operates the print engine 35a to generate a print job to print at a printing device. In an example, the print engine 35a routes the print job to the printing device associated with the consumer subscription service upon receiving a command from a user of the portable electronic device. In other examples, the command may be automatically generated when a direct connection between the portable electronic device and the printing device, such as via a Bluetooth connection with a beacon, to indicate that the user near the printing device.

The processor 40a is also to control the network interface 15a. In particular, the processor 40a may send instructions to the network interface 15a to receive the print data and to manage a subscription service.

Figure 4:
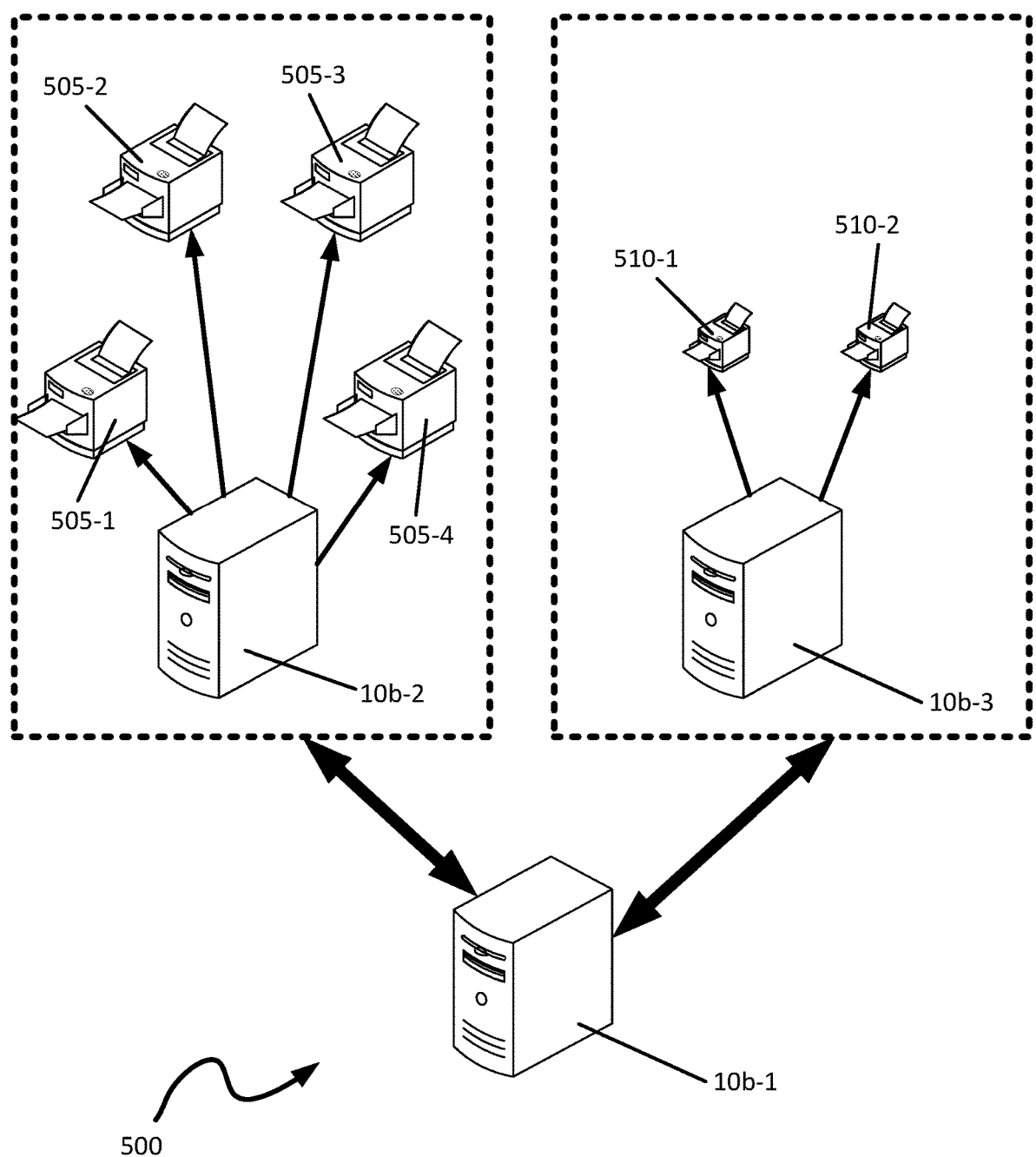
FIG. 4 is a schematic view of a system showing an implementation of the apparatus of FIG. 1.

Referring to FIG. 4, a schematic representation of a network system is generally shown at 500. The system 500 includes a plurality of print servers 10b-1, 10b-2, 10b-3 (generically, these print servers are referred to herein as "print server 10b" and collectively they are referred to as "print servers 10b", this nomenclature is used elsewhere in this description), a plurality of enterprise printing devices 505-1 to 505-4, and a plurality of personal printing devices 510-1 and 510-2.

In this example, a central print server 10b-1 communicates with an enterprise print server 10b-2 and a consumer print server 10b-3. It is to be appreciated that in this example, the print server 10b-1 may be used to communicate between the different contractual platforms of the enterprise print server 10b-2 and the consumer print server 10b-3. For example, the central print server 10b-1 may be used to apply print credits to the enterprise subscription service on the enterprise print server 10b-2 when the print job is work-related and to credit the consumer subscription service on the consumer print server 10b-3 after the print job is completed as described in greater detail above.

Various advantages will now become apparent to a person of skill in the art. For example, the apparatus 10 and/or the network system 500 may allow for other applications that will benefit from deducting print credits and applying offsets across contractual platforms. For example, small businesses or individuals who have a consumer subscription service may want to share their printers with a client or visitor may use the apparatus 10 to provide access to a printer such that the client or visitor may use their own subscription service account to print from a local printer at the business or individual's location. Other applications where a visitor is at a location with a different contractual platform may benefit from the apparatus 10. Although the previous examples provided illustrate deducting print credits from an account of an enterprise subscription service and providing offset credits to an account of a consumer subscription service, it is to be appreciated that the opposite can be done as well. Similarly, the apparatus 10 may be used to manage print credits and offset credits between accounts of two enterprise subscriptions services or accounts of two consumer subscription services.

It should be recognized that features and aspects of the various examples provided above may be combined into further examples that also fall within the scope of the present disclosure.

What is claimed is:

1. An apparatus comprising:
a network interface to receive print data from a device, wherein the print data is associated with a first subscription service;
a memory storage unit to store the print data, wherein the memory storage unit also includes a database of subscription services, wherein the database of subscription services includes the first subscription service and a second subscription service;
a subscription manager to manage the database of subscription services, wherein the subscription manager is to deduct print credit from a first subscription service account based on the print data; and
a selection engine to select a printing device for the print data, wherein the printing device is associated with the second subscription service and is not associated with the first subscription service.

2. The apparatus of claim 1, wherein the selection engine is to select the printing device based on a proximity of the device to the printing device.

3. The apparatus of claim 2, wherein the proximity is to be determined based on a connection between the device and the printing device.

4. The apparatus of claim 3, wherein the selection engine is to generate a prompt at the device to confirm the printing device to receive a print job associated with the print data.

5. The apparatus of claim 1, wherein the subscription manager is to calculate an offset credit to apply to a second subscription service account.

6. The apparatus of claim 5, wherein offset credit is equal to the print credit.

7. The apparatus of claim 1, wherein the print credit represents a number of pages.

8. The apparatus of claim 1, wherein the print credit represents a monetary amount.

9. The apparatus of claim 1, wherein a content or source of the print data is associated with the first subscription service, and wherein the subscription manager is further to associate the print data with the second subscription service despite the content or the source of the print data being associated with the first subscription service.

10. A non-transitory machine-readable storage medium encoded with instructions executable by a processor, the non-transitory machine-readable storage medium comprising:
instructions to receive, via a network interface, print data from a device, wherein the print data is associated with a first subscription service;
instructions to store the print data in a memory storage unit, wherein the memory storage unit also includes first subscription data associated with the first subscription service and second subscription data associated with a second subscription service;
instructions to select a printing device proximate to the device, wherein the printing device is to receive a print job based on the print data, and wherein the printing device is associated with the second subscription service and is not associated with the first subscription service;
instructions to route the print job to the printing device associated with the second subscription service; and instructions to modify the first subscription data based on the print data.

11. The non-transitory machine-readable storage medium of claim 10, wherein a proximity between the device and the printing device is to be determined based on a connection between the device and the printing device.

12. The non-transitory machine-readable storage medium of claim 10, comprising instructions to modify the second subscription data upon the printing device associated with the second subscription service printing content based on the print job.

13. The non-transitory machine-readable storage medium of claim 12, comprising instructions to calculate an offset credit to add to the second subscription data.

14. The non-transitory machine-readable storage medium of claim 10, wherein a content or source of the print data is associated with the first subscription service, and wherein the non-transitory machine-readable storage medium further comprise instructions to associate the print data with the second subscription service despite the content or the source of the print data being associated with the first subscription service.

15. A method comprising:
   receiving print data at a consumer print server, wherein the print data represents details about a print job associated with an enterprise print server;
   storing the print data in a memory storage unit, wherein the memory storage unit also includes consumer subscription data associated with a consumer subscription service;
   selecting a printing device proximate to a portable electronic device, wherein the printing device is associated with the consumer subscription service and is not associated with the enterprise print server;
   transmitting the print job to the printing device;
   deducting a consumer print credit from a consumer account the consumer subscription data based on the print data; and
   receiving an offset credit from the enterprise print server, the offset credit to be added to the consumer subscription data.

16. The method of claim 15, wherein selecting the printing device comprises identifying a connection between the portable electronic device and the printing device.

17. The method of claim 16, comprising generating a prompt at the portable electronic device, the prompt to select the printing device.

18. The method of claim 15, wherein a content or source of the print data is associated with the enterprise print server, and the method further comprises associating the print data with the consumer subscription data despite the content or the source of the print data being associated with the enterprise print server.

* * * * *